United States Patent [19]
Fletcher et al.

[11] 3,888,362
[45] June 10, 1975

[54] COOPERATIVE MULTIAXIS SENSOR FOR TELEOPERATION OF ARTICLE MANIPULATING APPARATUS

[76] Inventors: James C. Fletcher, Deputy Administrator of the National Aeronautics and Space Administration in respect to an invention of; Alan R. Johnston, La Canada, Calif.

[22] Filed: May 31, 1973

[21] Appl. No.: 475,336

[52] U.S. Cl............... 214/1 B; 214/1 CM; 318/640
[51] Int. Cl. ............................................. G05b 1/06
[58] Field of Search..... 214/1 B, 1 BB, 1 BC, 1 BD, 214/1 BS, 1 BT, 1 BH, 1 BV, 1 CM, 1 R; 318/640

[56] References Cited
UNITED STATES PATENTS

| | | | |
|---|---|---|---|
| 2,653,679 | 9/1953 | Hamilton, Jr. | 187/9 |
| 2,696,565 | 12/1954 | Shockley | 318/640 X |
| 3,007,097 | 10/1961 | Shellley et al. | 215/1 BC X |
| 3,272,347 | 9/1966 | Lemelson | 212/42.5 X |
| 3,596,153 | 7/1971 | Brainard | 318/640 X |

*Primary Examiner*—Frank E. Werner
*Attorney, Agent, or Firm*—Monte F. Mott; Paul F. McCaul; John R. Manning

[57] ABSTRACT

Apparatus for grasping an article under remote control is provided with a sensor comprised of a photodetecting cell divided into four quadrants to define X and Y coordinates and a light emitting diode on a Z axis normal to the X and Y axes. Two additional light emitting diodes are equally spaced on each side of the first diode along the X axis of the sensor. The diodes are sequentially energized and images of the diodes are reflected by a target comprising two plane mirrors and a corner retroreflector mounted on the article to produce signals from the cells which, when combined and nulled, will align X, Y and Z axes of the sensor with corresponding axes $X_m$, $Y_m$ and $Z_m$ of the target, and also decrease the distance between the sensor and the mirror to a predetermined value.

6 Claims, 9 Drawing Figures

PATENTED JUN 10 1975　3,888,362
SHEET 3
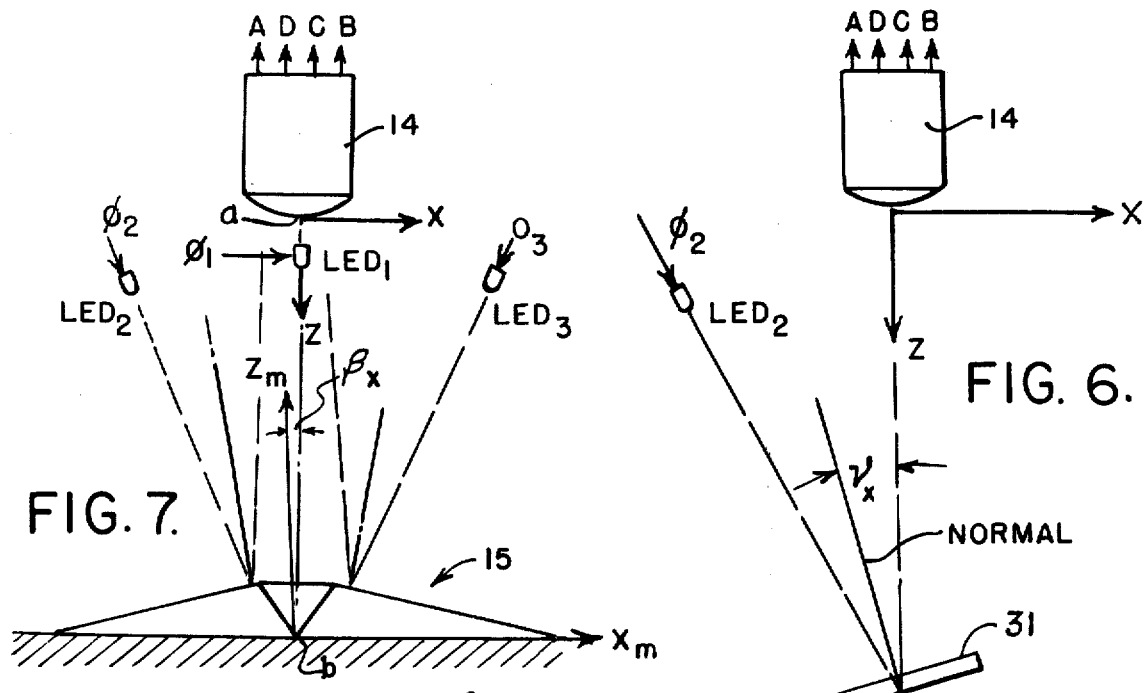
FIG. 7.
FIG. 6.
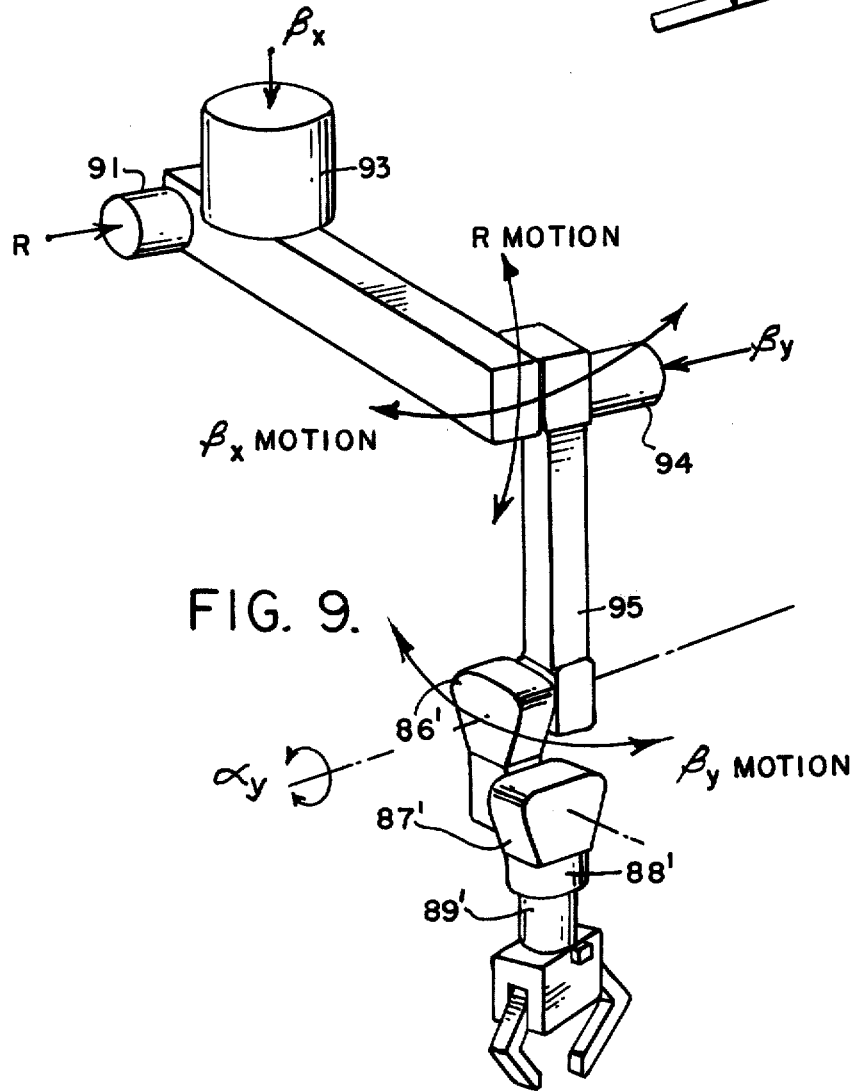
FIG. 9.

COOPERATIVE MULTIAXIS SENSOR FOR TELEOPERATION OF ARTICLE MANIPULATING APPARATUS

ORIGIN OF INVENTION

The invention described herein was made in the performance of work under a NASA contract and is subject to the provisions of Section 305 of the National Aeronautics and Space Act of 1958, Public Law 85-568 (72 Stat. 435; 42 USC 2457).

BACKGROUND OF THE INVENTION

This invention relates to apparatus for handling articles, and more particularly to alignment apparatus for sensing relative position and alignment of a grasping element with respect to a handle on the article.

There are numerous tasks involving the manipulation of an article from a remote location under the control of an operator who can place the grasping element in the proximity of the article, but cannot make the final positioning and orientation of the grasping element to successfully grasp the element. Under such conditions it is desireable to automate the task of positioning and orienting the grasping element with sufficient accuracy to enable the operator to grasp the handle expeditiously, or to even make the final act of grasping an automatic one.

Apparatus for manipulating articles under remote control have been in commercial use, sometimes in combination with position sensors, one along each axis of motion to aid in the task of grasping the element. However, such sensor-aided apparatus can usually be used in only a controlled environment where the orientation of the article vis-a-vis the grasping element is predetermined. Under such circumstances, it is then only necessary to align the grasping element with the article by nulling sensor signals. In operation where the orientation of the article vis-a-vis the grasping apparatus is not predetermined, such as in space or underwater exploration, simple sensors along each of two or three orthogonal axes relative to the article to be grasped will not suffice. What is required is a sensor system capable of producing signals which, when nulled, will align orthogonal X and Y axes of the grasping element parallel to corresponding axes of the article, and align the Z axis of the apparatus coincident with the Z axes of the article. In addition it is required that the system place the distance between the grasping element and the article along the Z axis at a predetermined value.

The teleoperation under control of an operator viewing the grasping element and the article from a remote location, as by television, can place the grasping element near the article to be grasped, and more particularly near a handle or the like on the article, with some first order accuracy in the alignment of the X, Y and Z axes of the grasping element with the corresponding axes of the article. Control of the operator in positioning the grasping element may then be terminated to permit servomechanisms of the sensor system to null the sensor signals, thus aligning the grasping element to a higher order of accuracy than is otherwise humanly possible. Once the servomechanisms have nulled the sensor signals, the operator can complete the teleoperation of grasping the handle.

SUMMARY OF THE INVENTION

Apparatus for grasping an article with an effector under remote control is provided with a sensor mounted on a grasping effector for aligning the effector of the apparatus with the article. The sensor detects spatial position and alignment relative to a specially prepared target comprising a corner retroreflector and two planes mirrors. The retroreflector provides a point reference, and the two mirrors provide two vector references in a plane of an $X_m$, $Y_m$ and $Z_m$ coordinate system of the target defined by the $X_m$ and $Z_m$ axes. The sensor includes a photodetecting means divided into four quadrants to define X and Y coordinates, and a pulsed light emitting means on a Z axis normal to the X and Y axes. Two additional light emitting means are equally spaced on each side of the first in the X-Z plane of the sensor. The light emitting means are sequentially energized to produce signals from the sensor quadrants which, when combined and nulled, will align X, Y and Z axes of the sensor with the corresponding $X_m$, $Y_m$ and $Z_m$ axes of the target, and decrease the distance between the sensor and the mirror to a predetermined value.

BRIEF DESCRIPTION OF THE DRAWINGS

FIG. 6 is a schematic diagram useful in understanding the function of a plane mirror in the target shown in FIG. 4.

FIG. 7 is a schematic diagram illustrating the composite functions of both mirrors and the retroreflector in the system of FIG. 1.

FIG. 9 illustrates an alternate embodiment of the present invention.

DESCRIPTION OF THE PREFERRED EMBODIMENTS

Figures 1, 2:
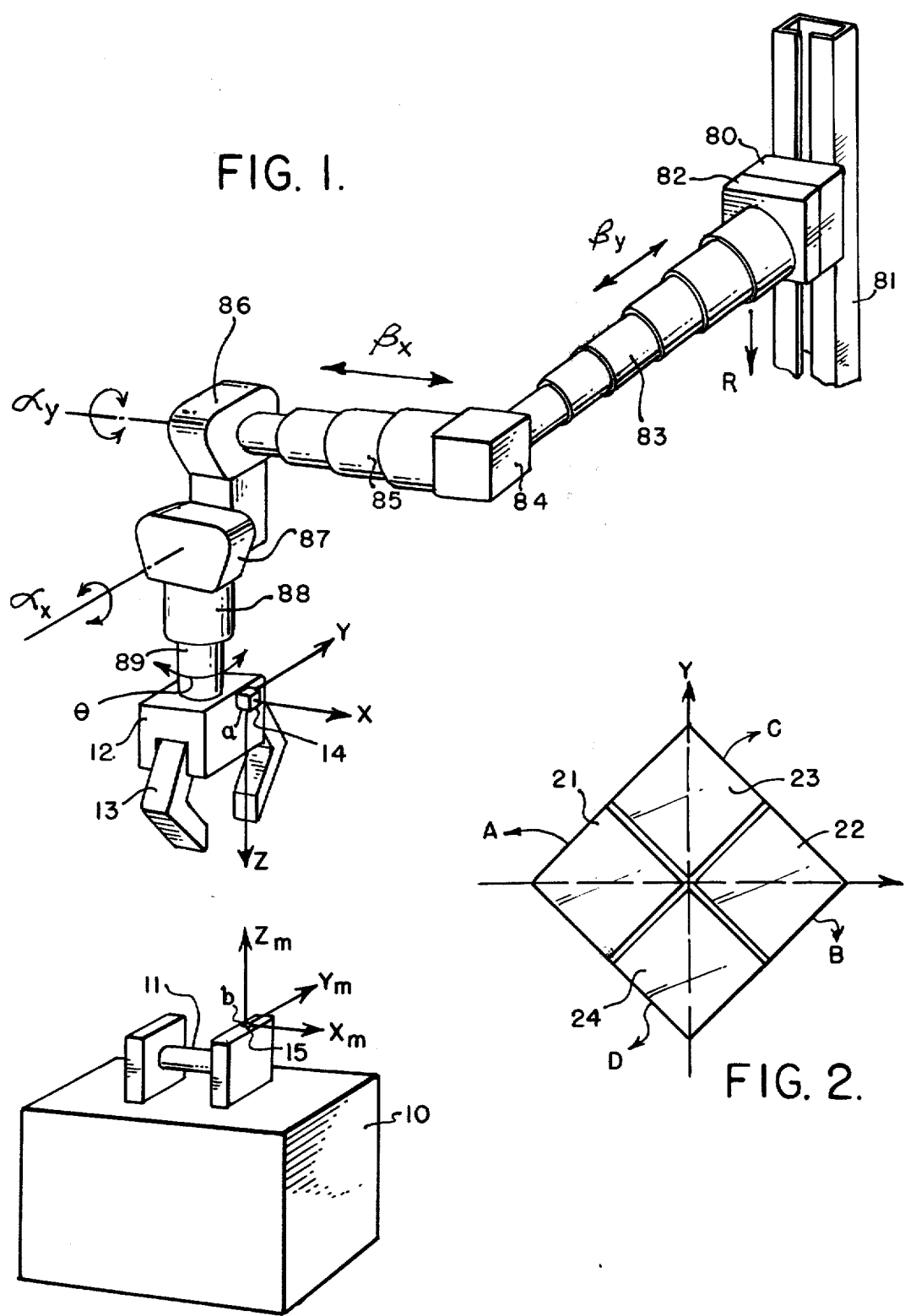
FIG. 1 is an isometric view of apparatus embodying the present invention.
FIG. 2 is a plan view of a planar light detector divided into four electrically independent quadrants for use in a sensor in the apparatus of FIG. 1.

Referring now to FIG. 1, apparatus is shown for lifting an article 10 having a handle 11 with an effector 12 having fingers 13 adapted to grasp the handle 11 once the effector 12 has been placed in proper spatial position and alignment. This task of lifting the article under remote control is but one example of numerous tasks involving manipulation in which the object to be manipulated is fitted with a fixture made to be engaged by a remotely controlled effector.

A more simple example would be an eye or pin on an article to be lifted by an overhead crane, but such a simple example will not adequately illustrate all of the advantages of the present invention. A standardized pin for a remotely controlled tong to grasp is another example. Still another example would be the task of inserting a coupling connector into a receptacle in an instrument module where, due to environmental conditions, manual insertion of the connector is not feasible.

Any operation where the design of the article to be manipulated can be fitted in advance with a handle, pin, eye, or the like, could be added to this list of examples. Consequently, reference to an effector having fingers for grasping a handle on an article in the exemplary embodiment of the invention to be described is by way of example, and not by way of limitation.

The part of the manipulation task to which the present invention pertains is the final task of positioning and orienting the effector prior to a final grasping action. Techniques presently employed for maneuvering the effector into the proximity of the handle on the article are to be employed. One such technique is to view the operation by television while the apparatus is remotely controlled by an operator. Another technique is to place a radiation source near the handle and, through a servomechanism using a radiation sensor on the effector, move the effector even closer to the source of radiation in approximately the correct orientation required for the final grasping action.

Once the effector is in the proximity of the handle to a first order of accuracy, it is necessary to adjust the spatial position and orientation of the effector for final and successful contact with the handle. After that orientation has been achieved, it is evident that the handle can be properly engaged by driving the effector arm in the Z direction relative to an X, Y and Z coordinate system of the effector a predetermined distance, or until contact with the handle is made, or to simply operate the effector to cause fingers 13 to close if the Z-axis null is arranged to place the effector in proper position on the Z-axis. In either case, successful engagement of the handle would only be possible if the X, Y and Z coordinate system of the effector is properly oriented with an X, Y and Z coordinate system of the handle, and more specifically if an X, Y and Z coordinate system of a sensor 14 mounted on one side of the effector is properly positioned and oriented with respect to an $X_m$, $Y_m$ and $Z_m$ coordinate system of a specially prepared target 15 on one side of the handle 11.

Figure 3:
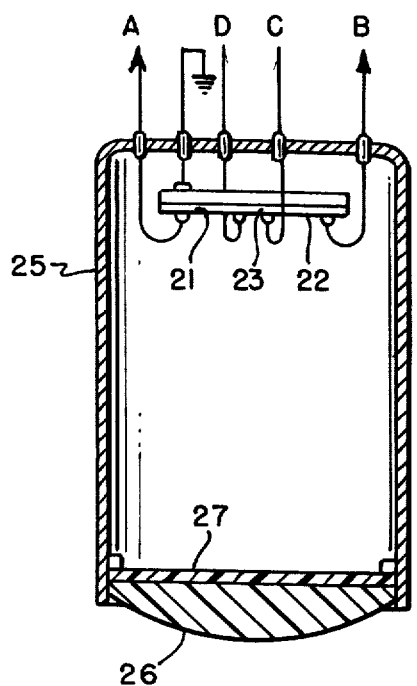
FIG. 3 is a sectional view of the sensor in the apparatus of FIG. 1.

The heart of the sensor consists of a photodetector such as a planar silicon photovoltaic cell divided into four electrically independent quadrants 21 through 24 by etching through the junction layer as shown schematically in FIG. 2. The overall size of the package for the detector shown in FIG. 3 could be of the order of two centimeters in diameter and three centimeters long. The package consists of a housing 25, a lens 26, and an infrared filter 27, all shown in a section through the centerline (Z axis) of the package. The filter prevents ambient light from entering the package. The lens focuses any light emitting diode image reflected from the target 15 onto the quadrants of the detector. The position of the image on the detector quadrants would vary with the direction of the reflected light image. Therefore proportioning of the total light flux between the quadrants 21 through 24 will depend on the angular position of the sensor with respect to the target 15. Output signas A, B, C and D are obtained from the separate quadrants of the light detector.

Figure 4:
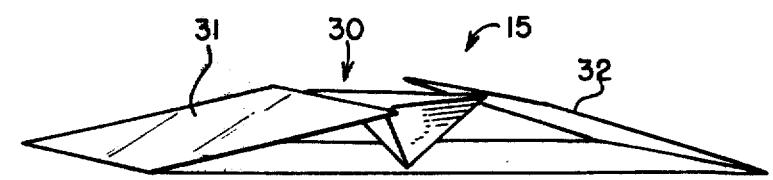
FIG. 4 is a perspective view of a target comprised of a corner-cube retroreflector and two plane mirrors for use in the system of FIG. 1.
Figure 5:
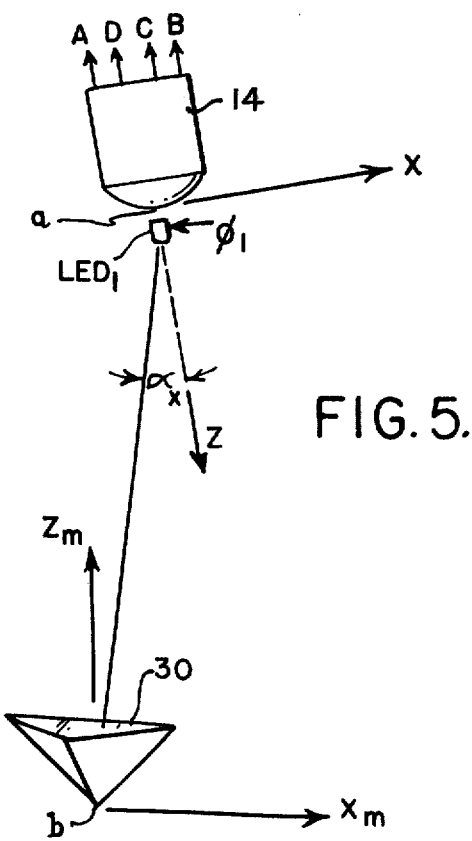
FIG. 5 is a schematic diagram used to explain the function of the retroreflector in the target shown in FIG. 4.

The target 15 shown in a perspective view in FIG. 4 is comprised of a corner-cube retroreflector 30 and two plane mirrors 31 and 32. The function of the retroreflector is to provide a point reference in a fixed position relative to the handle 11. As illustrated in FIG. 5, a light emitting diode $LED_1$ just in front of the sensor on the Z axis is reflected back on itself into the sensor. The orientation of the sensor achieved through manual control of apparatus shown in FIG. 1 is assumed to be such that the $LED_1$ image will fall roughly along the X axis on the detector shown in FIG. 2.

The orientation of the effector vis-a-vis the handle to be achieved by this invention is precisely as shown in FIG. 1, but initially the asimuthal orientation of the effector, and therefore the sensor, amy be off by as much as 45° to 50°. However, the image of the light source $LED_1$ will still fall on the quadrant 21 or the quadrant 22, or in a position such that both the quadrant 21 and the quadrant 22 will receive some light flux. If the light flux is equally divided between the two quadrants, it is evident that the direction of the reflected light image is in the Y-Z plane. In any case, the quadrants 21 and 22 produce output signals A and B the difference between which is proportional to the deviation of the axis of the sensor from the direction of the apex of the retroreflector 30, i.e., proportional to the angle $\alpha_x$ (in the X-Z plane) between a line $a$–$b$ shown in FIG. 5 and the Z axis of the sensor.

If the difference between the two output signals A and B is produced as a signal $V_{x1}$, it is evident the signal may be applied to a servomotor for the apparatus shown in FIG. 1 to drive the effector 12, and therefore the sensor 14, through an arc in the plane X-Z until that signal is nulled. Then the axes of the sensor will be pointing to the apex of the retroreflector 30, but will not necessarily be in coincidence with the axis $Z_m$ of the target.

The remaining quadrants 23 and 24 produce output signals C and D the difference between which is a signal $V_{y1}$ (when the diode $LED_1$ is pulsed) which indicates an angle $\alpha_y$, corresponding to the angle $\alpha_x$, but in the Y-Z plane. That signal may be applied to a servomotor of the apparatus shown in FIG. 1 to drive the effector 12, and therefore the sensor 14, through an arc in that plane until that signal is nulled, at which time the axis of the sensor will point in the direction of the apex of the reflector 30 in the Y-Z plane.

When the Z axis of the sensor points in the direction of the apex of the retroreflector in both the X-Z and the Y-Z plane, the Z axis is aligned with that direction, i.e., the sensor is pointing straight to that point reference provided by the retroreflector. It is still necessary to drive the sensor position through an arc such that the Z axis is coincident with the corresponding $Z_m$ axis of the target.

If a plane mirror is substituted for the corner reflector and a light emitting diode $LED_2$ shown in FIG. 6 is pulsed, a signal $V_{x2}$ derived from the difference A-B would depend upon the angle $\nu_x$ between the sensor Z axis and the a line normal to the surface of the mirror 31 on the X-Z plane. The positon of the light emitting diode is in the X-Z plane of the XYZ coordinates system of the sensor 14. The plane mirror 31 can thus provide a reference vector independent of translation of the sensor relative to the target just as the corner reflector can provide a reference point independent of orientation of the sensor relative to the target. A light emitting diode $LED_3$ on the other side of the sensor axis and in the X-Z plane can similarly provide a second reference vector as shown in FIG. 7. The composite target shown in FIG. 7 brings together the point and vector references.

The composite target includes the corner reflector 30 and the plane mirror 31 and 32. Together they define the fixed coordinate system $X_m$, $Y_m$ and $Z_m$ as shown, but they are used separately by separately pulsing the three light emitting diodes $LED_1$, $LED_2$ and $LED_3$. A three phased clock system is used to pulse the diodes such that a pulse $\phi_1$ fires diode $LED_1$ followed by time spaced pulses $\phi_2$ and $\phi_3$ which sequentially fire the light emitting diodes $LED_2$ and $LED_3$. The signals $V_{xn}$=A−B and $V_{yn}$=C−D are sampled during the three phases to produce a set of six signals $V_{x1}$, $V_{x2}$, $V_{x3}$, $V_{y1}$, $V_{y2}$ and $V_{y3}$. The light emitting diodes $LED_2$ and $LED_3$ are mounted far enough from the sensor axis that any reflections of their light by the retroreflector 30 does not enter the sensor 14. In that manner the light emitting diode $LED_1$ is caused to operate with the corner reflector 30, as described hereinbefore, while the light emitting diodes $LED_2$ and $LED_3$ are caused to operate with the respective plane mirrors 31 and 32.

Before proceeding with a description of how the signals A, B, C and D from the four quadrants of the detector are combined as the different signals $V_{xn}$ and $V_{yn}$ during each of the $n$ phases of the clock, and then further combined to provide drive signals to the servomotors of the apparatus shown in FIG. 1, two remaining references will be discussed. Those references are azimuthal rotation, $\theta$, about the sensor axis, and linear distance, R, from the sensor to the target. Both $\theta$ and R depend on appropriate combinations of te signals $V_x$ and $V_y$ sampled during phases $\phi_2$ and $\phi_3$. For example, the sensor will indicate the apparent direction of the light emitting diode $LED_2$ reflected by the mirror 31 in terms of the signal $V_x$ sampled during phase $\phi_2$. This in turn will depend on the orientation of the sensor vis-a-vis the target, shown as the angle $\beta_x$, and the distance R from the sensor to the target. The angle $\beta_x$ in FIG. 7 is measured between the retroreflector reference (the line a–b from the sensor to the retroreflector) and the axis $Z_m$ of the target in the Z-X plane of the sensor. A corresponding angle $V_y$ exists between the line a–b and the axis $Z_m$ of the target in the plane Z-Y of the sensor. The azimuthal angle between the X axis of the sensor and the $X_m$ axis of the target is then the angle $\theta$ which is a measure of the azimuthal error in the orientation of the X and Y axis of the sensor with the $X_m$ and $Y_m$ axis of the target about the Z axis.

From the foregoing it is evident that this arrangement of the sensor with its three light emitting diodes and the target with its three reflectors will provide the following measurable angles: $\alpha_x$, $\alpha_v$, $\beta_x$, $\beta_y$ and $\theta$, and a distance, R, along the line a-b from the sensor to the target. The phase detected output signals $V_{xn}$ and $V_{yn}$ are combined to yield signals proportional to these variables in the following manner:

$$\alpha_x = V_{x1} \quad (1)$$

$$\alpha_y = V_{y1} \quad (2)$$

$$\beta_x = V_{x2}+V_{x3} \quad (3)$$

$$\beta_y = V_{y2}+V_{y3} \quad (4)$$

$$R = V_{x2}-V_{x3} \quad (5)$$

$$\theta = V_{y2}-V_{y3} \quad (6)$$

Differences in gain between these coordinate signals have been neglected in these equations for simplicity. However, from the schematic diagram shown in FIG. 8 of a system for combining these signals according to these equations, it is evident that the gain between these coordinate signals may be adjusted for optimum performance.

Figure 8:
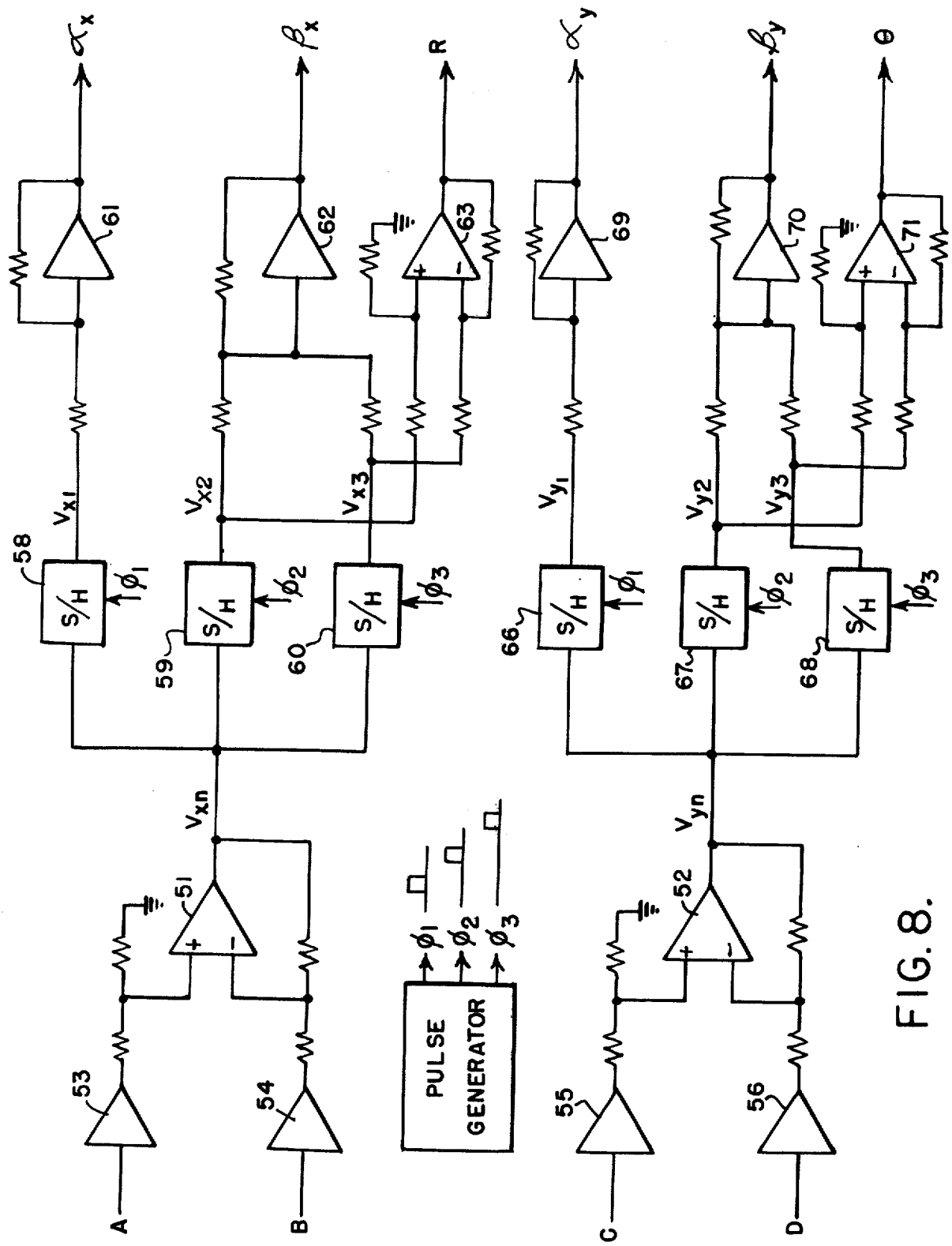
FIG. 8 is a schematic diagram illustrating the manner in which sensor signals are combined to provide a set of six coordinate offset signals for use in driving the apparatus of FIG. 1 into proper alignment and position.

Referring now to FIG. 8, the signals A, B, C and D derived from the respective quadrants 21, 22, 23 and 24 in response to reflected light from diodes $LED_1$, $LED_2$ and $LED_3$ pulsed in sequence. Those signals are continually combined to produce the different signal $V_{xn}$=A−B and $V_{yn}$=C−D using differential amplifiers 51 and 52 fed through preamplfiers 53, 54, 55 and 56. The signal $V_{xn}$ is sampled during phases $\phi_1$, $\phi_2$ and $\phi_3$ in respective sample and hold circuits 58, 59 and 60. The sampled signal $V_{xn}$ during the phase $\phi_1$ is denoted in the drawing by the subscript 1 following subscript $x$. Similarly, the signal $V_{xn}$ sampled during phases $\phi_2$ and $\phi_3$ are denoted by the subscripts 2 and 3 following the subscript $x$.

Referring to equations (1) to (6) above, it is seen that theoutput signal proportional to the angle $\alpha_x$ is equal to the signal $V_{x1}$. Therefore, the signal $V_{x1}$ may be used to drive an $\alpha_x$ servometer in the system of FIG. 1 through an operational amplifier 61 (FIG. 8) having a nominal gain of 1. That gain may be adjusted as determined empirically for optimum performance. A signal proportional to the angle $\beta_x$ is given by the sum of the signals $V_{x2}$ and $V_{x3}$. Consequently, to produce a signal proportional to that sum, an operational amplifier 62 is provided, also with a nominal gain of 1 which may be adjusted as required. The signal proportional to the distance R is given by the difference between the signals $V_{x2}$ and $V_{x3}$ and is provided by a differential amplifier 63, which may also be adjusted in gain.

The signal $V_{yn}$ is similarly sampled during phases $\phi_1$, $\phi_2$ and $\phi_3$ by sample and hold circuits 66, 67 and 68. The signal $V_{y1}$ produces an output signal through an operational amplifier 69 proportional to the angle $\alpha_y$ according to equation (2). A summing amplifier 70 produces an output signal proportional to the angle $\beta_y$ according to equation (4). A signal proportional to azimuthal rotation $\theta$ according to equation (6) is given by an amplifier 71.

It should be noted that these signals derived according to equations (1) through (4) and (6) are all of a polarity according to the direction of the corresponding angle. Consequently, when applied to servomotors of the apparatus shown in FIG. 1 the polarities of these signals must be chosen in the proper sense to produce motion in the direction that will tend to null the drive signal. It should also be noted that although the signals $V_{xn}$ and $V_{yn}$ are continually changing, the change is sufficiently slow relative to the rate of the clock pulses for equations (3) through (6) to hold true at any given time.

Referring now to FIG. 1, the signal R is applied to a servomotor represented by a block 80 which drives the entire apparatus supporting the effector 12 in a downward direction as viewed in the drawing along a track 81 until a predetermined null is reached, at which time the sensor 14 is a predetermined distance from the target 15. A simple rack and pinion drive may be used for that motion.

The signal $\beta_y$ is applied to a second servomotor represented by a block 82 carried by the block 80. That servomotor drives a hydraulic mechanism to extend, or contract, a telescoping boom 83 to produce motion of the remaining apparatus supporting the effector 12 in the direction of the Y axis of the sensor 14 until a null in the signal $\beta_y$ is achieved.

The signal $\beta_x$ is applied to a servomotor represented by a block 84 which drives a hydraulic mechanism to extend, or contract, a telescoping boom 85. That moves the remaining mechanism supporting the effector 12 along the X axis of the sensor 14.

The signal $\alpha_y$ is applied to a servomotor in a housing 86 to turn the remaining apparatus supporting the effector 12 about the axis of the boom 85. Similarly, the signal $\alpha_x$ is applied to a servomotor in a housing 87 to turn the remaining apparatus supporting the clock 12 about an axis normal to the axis of the boom 85. And finally, the signal $\theta$ is applied to a servomotor in a housing 88 which rotates the effector 12 on a shaft 89.

In describing the motion produced by the signals $\alpha_y$, $\alpha_x$, $\beta_y$, $\beta_x$ and $\theta$ applied to respective servomotors, references could be made to the axis X, Y and Z of the sensor 14 as though the motion produced by each servomotor was actually in relation to those axes as the drawing suggests. However, that is not strictly correct, but is helpful in understanding the servomechanism operation when it is considered that the effector 12 has previously been placed in approximately the correct spatial position and orientation by an operator. Only small adjustments are then necessary to provide the proper spatial position and orientation of the effector 12 to orient the X, Y and Z axes with the $X_m$, $Y_m$ and $Z_m$ axes of the target. For example, the shaft 89 turns on an axis which is offset from the Z axis so that while moving the X and Y axes about the Z axis to orient them with the $X_m$ and $Y_m$ axes, the Z axis is also being moved, but since all servomotors drive to a null, the Z axis will ultimately come to rest parallel to and in coincidence with the $Z_m$ axis of the target, and the X and Y axis will come to rest in a position parallel to the $X_m$ and $Y_m$ axes of the target. Consequently it can be considered that the servomotor 88 rotates the effector 12 about the Z axis of the sensor. Working back through servomotors responsive to the signals $\alpha_x$, $\alpha_y$, $\beta_x$ and $\beta_y$, the motion produced by each can be considered relative to the axes of the sensor.

Once all servomotors have been driven to a null, all motion of the effector 12 will cease. At that time, a servomotor in the effector 12 may be manually energized (or automatically energized upon detecting a null condition) to cause the shaft 89 to be hydraulically extended (assuming a telescoping shaft) a predetermined distance to place the fingers of the effector in proper position for closing around the handle 11 of the article 10.

FIG. 9 illustrates an alternative arrangement of servomotors and booms, or arms, for placing the effector 12 in proper spatial position and orientation in response to the same six signals applied to the apparatus of FIG. 1. In this arrangement, all motion is rotational to avoid the use of telescoping booms, or their equivalents. The use of rotational motion in every instance is valid because only small adjustments are required to place the effector 12 in proper spatial position and orientation. The signal R is applied to a servomotor 91 which rotates a boom 92 about the axis of the motor 91 as shown. At the same time, the signals $\beta_x$ and $\beta_y$ are applied to servomotors 93 and 94. The servomotor 93 swings the boom 92 through a small arc about the axis of the motor 93 as shown and the motor 94 swings a boom 95 through a small arc about the axis of the motor 94 as shown. The arcs are so small that the motions at the ends of the booms apprach a straight line tangent to the arc. The remaining structure connected to the boom 95 is the same as in the embodiment of FIG. 1 the elements of which are identified by the same reference numerals as in FIG. 1, but distinguished by primed reference numerals.

In summary, a multiaxis sensor is provided on an effector to sense relative spatial position and alignment of effector with respect to a specially prepared target mounted on an article to be manipulated. The sensor has orthogonal X, Y and Z axes built into it, where the Z axis is chosen to be along a direction in which final motion of the effector is to take place after the axes of the sensor have been aligned with corresponding axes of the target. To accomplish that, the target has a geometrical reference coordinate system built into it and is comprised of a corner retroreflector and two plane mirror surfaces on opposite sides of the retroreflector, each with a line normal to its reflecting surface at the same angle with a line passing through the apex of the retroreflector at equal angles from all sides of the retroreflector. That line passing through the apex defines an axis $Z_m$ of the reference coordinate system. A line normal to the $Z_m$ axis in a plane defined by the $Z_m$ axis and a line normal to each of the plane mirrors comprises an axis $X_m$ for the target. The third axis $Y_m$ is orthogonal to the $X_m$ and $Z_m$ axis.

The sensor is comprised of a planar photodetecting means divided into four electrically independent quadrants, and means for focusing a light image received onto the plane of the photodetecting means. The axis of the focusing means normal to the plane of the detectors constitutes the Z axis of the sensor. A line passing through the centers of two diagonally opposite light detectors, and through the center of the four quadrants, defines the direction of the sensor X axis, and a line orthogonal to the X and Z axes defines the direction of the sensor Y axis.

A first pulsed light emitting means is placed in front of the lens on the Z axis of the sensor, and second and third pulsed light emitting means are equally spaced on opposite sides of the Z axis in a plane passing through the sensor X axis. The light emitting means are pulsed in sequence. For each one pulsed, the signals from diametrically opposed quadrants are combined in pairs to obtain signals $V_{xn}$ and $V_{yn}$ as the differences of the paired detector signals, where the subscripts X and Y indicate the sensor axes along which the paired quadrants are disposed, and $n$ represents the numerals 1, 2 and 3 indicating which of the light emitting means was fired to produce the signals combined. The numeral 1 indicates the one disposed on the Z axis of the sensor.

The amplitudes of the signals $V_{x1}$ and $V_{y1}$ are proportional to the angles $\alpha_x$ and $\alpha_y$ in the respective Z-X and Z-Y planes between the sensor Z axis and a line from the origin of the X, Y and Z coordinate system to the apex of the retroreflector. Similarly, when one of the other two diodes is pulsed, the output signal $V_x$ produced by an image of that light emitting diode reflected by a plane mirror on the target to the sensor would be proportional to the angle $\nu_x$ between the sensor axis and a line normal to the reflecting mirror surface. That signal produced when the second light emitting diode is pulsed is identified as a signal $V_{x2}$. A corresponding signal produced when the third light emitting diode is pulsed to reflect from the other plane mirror is identified as a signal $V_{x3}$. A second set of signals $V_{y1}$, $V_{y2}$ and $V_{y3}$ corresponding to the set $V_{x1}$, $V_{x2}$ and $V_{x3}$ is produced concurrently.

The complete set of six signals thus produced yield a measure of the extent the X, Y and Z axes of the sensor differ in position and orientation with the axes $X_m$, $Y_m$ and $Z_m$ of the target. The set of six signals are combined according to equations (1) through (6) to produce analog signals for driving servomechanisms of the apparatus until those signals are nulled, thus placing the axes of the sensor in proper spatial position and orientation with respect to the axes of the target such that the Z and $Z_m$ axes are coincident, and the X and Y axes of the sensor are parallel to the $X_m$ and $Y_m$ axes. The analog signal R thus produced is proportional to the distance along the Z axis between the sensor and the target. The signal $\theta$ is proportional to the azmithul angle between the X or Y axis and the corresponding axis of the target and is used simply to rotate the grasping element which carries the sensor to orient the X and y axis of the sensor with the X and Y axis of the target. The $\alpha_x$ and $\alpha_y$ signals are used to drive the signals $V_{x1}$ and $V_{y1}$ to a null, thereby aligning the Z axis of the sensor with the origin of the target fixed coordinate system. The $\beta_x$ and $\beta_y$ signals are then used to effectively move the Z axis of the sensor along the respective X and Y axes to bring the Z axis into coincidence with the $Z_m$ axis of the target.

Although a particular embodiment of the invention has been described and illustrated herein, it is recognized that modifications and variations may readily occur to those skilled in the art. It is therefore intended that the claims be interpreted to cover such modifications and variations.

What is claimed is:

1. In apparatus for grasping an article under remote control, a system for detecting spatial position and orientation of a grasping effector relative to said article comprising a sensor including a planar photodetecting means divided into four quadrants to define X and Y coordinates, and a first light emitting diode means on a Z axis normal to the X and Y axes and the plane of said photodetecting means, two additional light emitting means equally spaced on each side of said first diode in a plane defined by said X and Z axes, and means for sequentially energizing said light emitting means, and a target comprising two plane mirrors and a corner retroreflector mounted on said article to reflect images of said light emitting means as they are energized in sequence in order to produce signals from said quadrants which, when combined and nulled, will align said X, Y and Z axes of said sensor with corresponding axes $X_m$, $Y_m$ and $Z_m$ of said target where said $Z_m$ axis is at equal angles from all sides of said retroreflectors, said $X_m$ axis is perpendicular to said $Z_m$ axis and passes through each of said two plane mirrors disposed on opposite sides of said retroreflector, and said $Y_m$ axis is perpendicular to said $Z_m$ and $X_m$ axes, and will also decrease the distance between the sensor and the mirror to a predetermined value.

2. In apparatus for manipulating an article under remote control, said apparatus having means for grasping a specially prepared handle on said article and means responsive to feedback signals for automatic control of spatial position and orientation of said grasping means with respect to said handle, means for generating said feedback signals comprising in combination a target mounted on the handle comprising means for establishing two optical vectors in a plane defined by $X_m$ and $Z_m$ axes of an $X_m$, $Y_m$ and $Z_m$ coordinate system where axes $X_m$ and $Y_m$ are perpendicular to each other and to axis $Z_m$, and axis $Z_m$ is in the direction of desired approach for said grasping means, said reference vectors being equidistant from said axis $Z_m$ and at equal acute angles from said axis $Z_m$, sensing means having mutually perpendicular X, Y and Z axes mounted on said grasping means for detecting said target and developing response signals proportional to spatial position and orientation from said point reference and said two vector references, and means for developing said feedback signals from said response signals to drive said automatic control means to a null for a corresponding spatial position and orientation of the X, Y and Z axes of said sensing means with the $X_m$, $Y_m$ and $Z_m$ axes of said target, and a predetermined distance from the intersection of said $X_m$, $Y_m$ and $Z_m$ axes.

3. The combination defined in claim 2 wherein said target is comprised of a corner retroreflector having its apex at the intersection of said axis $X_m$, $Y_m$ and $Z_m$, and two plane mirrors disposed about said retroreflector and opposite each other, the reflecting surface of each plane mirror being positioned to have a line normal to its reflecting surface at said acute angle from said axis $Z_m$ in said $X_m$-$Z_m$ plane, and said sensor is comprised of a planar photodetecting means divided into four quadrants A, B, C and D to define X and Y axes normal to a Z axis perpendicular to the center of the plane of said quadrants, the X axis being parallel to a line passing through the centers of diagonally opposite quadrants A and B and the Y axis being parallel to a line passing through the centers of the remaining diagonally opposite quadrants C and D, and three pulsed light emitting sources, one disposed on the Z axis of said sensor and the remaining two disposed in a plane defined by said X and Z axes of said center at equal distances from said Z axis.

4. The combination of claim 3 wherein said means for developing said feedback signals is comprised of means for pulsing said light emitting means in nonoverlapping sequential phases $\phi_1$, $\phi_2$ and $\phi_3$ starting with the light emitting means on said Z axis during phase $\phi_1$, means for combining signals from said quadrants A, B, C and D during each phase to obtain signals $V_{xn}$ and $V_{yn}$ according to the equations $$V_{xn} = A - B$$
$$V_{yn} = C - D$$

where the subscript $n$ indicates the phase, means for separately and repeatedly sampling and holding said signals $V_{xn}$ and $V_{yn}$ during successive phases to obtain separate signals $V_{x1}$, $V_{x2}$, $V_{x3}$, $V_{y1}$, $V_{y2}$ and $V_{y3}$, and means for combining the separate signals according to the following equations $$\alpha_x = V_{x1}$$
$$\alpha_y = V_{y1}$$
$$\beta_x = V_{x2} + V_{x3}$$
$$\beta_y = V_{y2} + V_{y3}$$
$$R = V_{x2} - V_{x3}$$
$$\theta = V_{y2} - V_{y3}$$

where the signal R is proportional to the distance between said sensor and said point reference of said target along the Z axis of said sensor, the signal $\theta$ proportional to the azmithul angle between the X axis of said sensor and the $X_m$ axis of said target, the $\alpha_x$ and $\alpha_y$ signals are proportional to the angles between the Z axis of said sensor and a line between the center of said sensor and said point reference in respective planes X-Z and Y-Z defined by the axes X and Z and the axes Y and Z of said sensor, and the signals $\beta_x$ and $\beta_y$ are proportional to the angles between the $Z_m$ axis of said target and said line between the center of said sensor and said point reference in respective planes $X_m$-$Z_m$ and $Y_m$-$Z_m$ defined by the axes $X_m$ and $Z_m$ and the axes $Y_m$ and $Z_m$.

5. In apparatus having a servomechanism for automatically adjusting the spatial position and orientation of an effector relative to an article, a system for sensing relative spatial position and alignment of said effector with respect to a specially prepared target mounted on said article utilizing a sensor having orthogonal X, Y and Z axes built into it for alignment with a corresponding orthogonal $X_m$, $Y_m$ and $Z_m$ axis built into said target, said target being comprised of a composite of a corner retroreflector and two plane mirrors disposed on opposite sides of said retroreflector, each plane mirror having a line normal to its reflecting surface at an equal angle with a line passing through the apex of said retroreflector at equal angles from all sides, said plane passing through said axis $Z_x$ which intersects said axis $Z_m$ at said apex, and said sensor being comprised of a planar photodetecting means divided into four electrically independent quadrants, means for focusing a light image received from said target onto planar photodetecting means, where the axis of the focusing means normal to the planar photodetecting means constitutes said Z axis, a first pulsed light emitting means placed in front of said focusing means on said Z axis, and second and third pulsed light emitting means equally spaced on opposite sides of said Z axis in a plane passing through the said X axis, where the direction of said X axis is defined by a line passing through the centers of two dramatically opposite quadrants, means for pulsing said diodes in phased sequence, means for combining said signals from diametrically opposite quadrants along said X axis and along said Y axis to obtain signals $V_{xn}$ and $V_{yn}$ as each of said first, second and third light emitting means is pulsed in sequence, where the subscripts $n$ represents the numbers 1, 2 and 3 corresponding to the order in which said light emitting means are pulsed and the subscripts $x$ and $y$ correlate the pair of quadrants by their associated axis, and where each of said signals $V_{xn}$ and $V_{yn}$ are the differences of the signals from the paired quadrants, means for sampling signals $V_{x1}$ and $V_{y1}$ as servomechanism feedback signals proportional to angles $\alpha_x$ and $\alpha_y$ in respective Z-X and Z-Y planes between said Z axis and a line from the intersection of the X, Y and Z axes of said sensor to the apex of said retroreflector, means for sampling signals $V_{x2}$, $V_{y2}$, $V_{x3}$ and $V_{y3}$ in pairs paired by the subscript numerals, means for combining sampled signals $V_{x2}$, $V_{y2}$, $V_{x3}$ and $V_{y3}$ as paired by their subscripts $x$ and $y$ to obtain as feedback signals their sums and differences, their sums producing signals proportional to angles $\beta_x$ and $\beta_y$ in respective $Z_m$-$X_m$ and $Z_m$-$Y_m$ planes between said $Z_m$ axis and said line from the intersection of the X, Y and Z axes of said sensor to the apex of said retroreflector, and their respective differences producing signals proportional to distance along said Z axis and azmithul angle, $\theta$, between said sensor X or Y axis and the corresponding target axis $X_m$ or $Y_m$, and separate servomotors responsive to said feedback signals in said servomechanism to drive said effector to a position which nulls said feedback signals.

6. The combination of claim 5 wherein said signals $V_{x1}$ and $V_{y1}$ are applied to servomotors which drive said deflector to effectively align the Z axis of said sensor with the apex of said retroreflector, thereby reducing said angles $\alpha_x$ and $\alpha_y$ toward zero, and said signals proportional to angles $\beta_x$ and $\beta_y$ are applied to servomotors which drive said effector to effectively move the Z axis of said sensor along its respective X and Y axis to bring its Z axis into coincidence with the $Z_m$ axis of said target while said signal proportional to azmithul angle, $\theta$, is applied to a servomotor which relates said effector to effectively rotate said sensor about its Z axis, thereby reducing said azmithul angle toward zero, and while said signal proportional to distance, R, is applied to a servomotor which drives said effector in a direction parallel to said Z axis of said sensor.

* * * * *